Jan. 1, 1963 R. L. DEW 3,071,646

FACSIMILE RECORDING APPARATUS

Filed Oct. 12, 1959 4 Sheets-Sheet 1

INVENTOR
Robert L. Dew

By John C Black
ATTORNEY

Jan. 1, 1963 R. L. DEW 3,071,646

FACSIMILE RECORDING APPARATUS

Filed Oct. 12, 1959 4 Sheets-Sheet 2

INVENTOR.
Robert L. Dew

BY John C Black
ATTORNEY

Jan. 1, 1963 R. L. DEW 3,071,646

FACSIMILE RECORDING APPARATUS

Filed Oct. 12, 1959 4 Sheets-Sheet 3

INVENTOR.
Robert L. Dew

BY John C Black
ATTORNEY

Jan. 1, 1963 R. L. DEW 3,071,646
FACSIMILE RECORDING APPARATUS
Filed Oct. 12, 1959 4 Sheets-Sheet 4
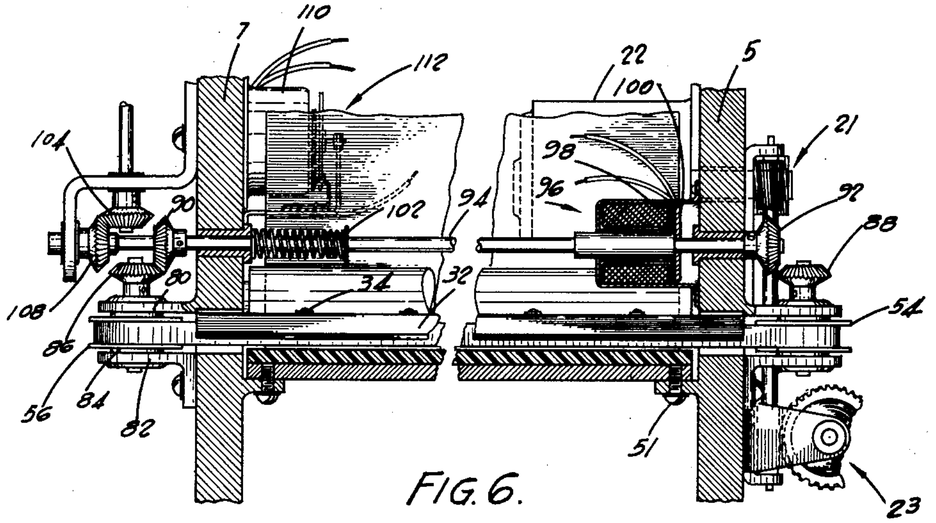
FIG. 6.
FIG. 7.
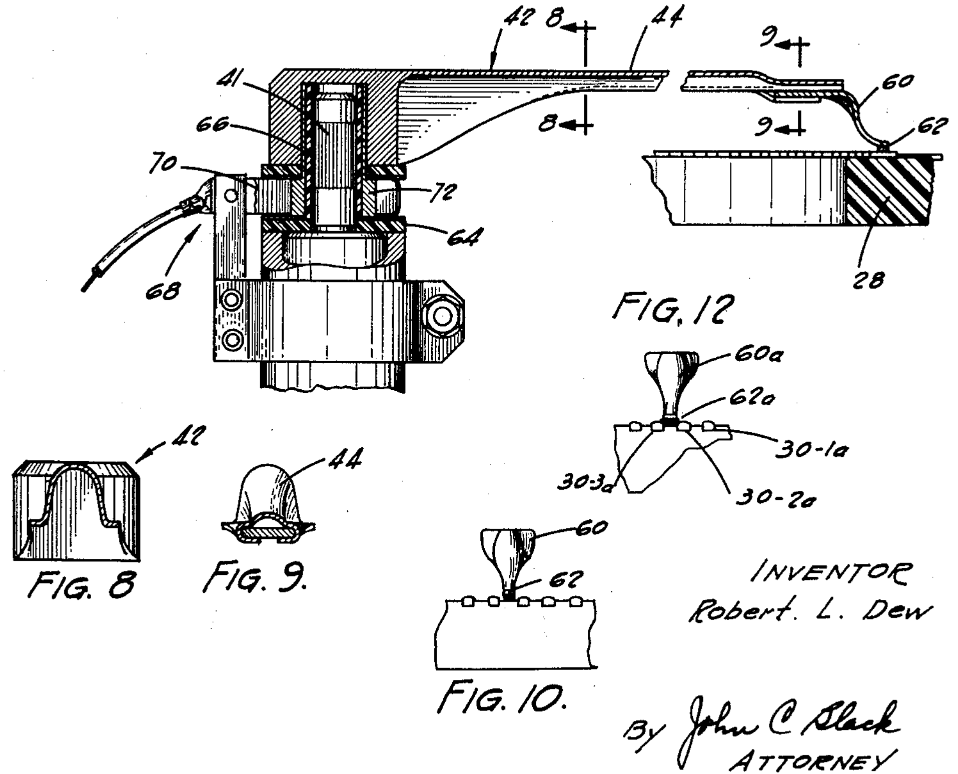
FIG. 12, FIG. 8, FIG. 9, FIG. 10.
INVENTOR
Robert L. Dew
By John C Black
ATTORNEY 3,071,646
FACSIMILE RECORDING APPARATUS Robert L. Dew, Bensonville, Ill., assignor to Stewart-Warner Corporation, Chicago, Ill., a corporation of Virginia Filed Oct. 12, 1959, Ser. No. 845,746
8 Claims. (Cl. 178—6.6)

This invention relates generally to facsimile equipment and more particularly to an improved facsimile recorder.

Commercial facsimile recording equipment is typically characterized by a rotating drum having a helix electrode thereon cooperating with a printer electrode in the form of a straight bar for reproducing copy. This arrangement, because of various vibrational and wear problems, has inherently resulted in unusually high costs. In addition, the speed of recording is substantially limited. However, in spite of these serious disadvantages, commercial apparatus so far as is known has necessarily incorporated this helix design in order to achieve commercially acceptable operation.

In a few instances, there has been some deviation from this technique but only where specialized results are to be obtained. For example, in temperature recording equipment where it is only necessary to print straight lines with varying color intensity, spaced contacts have been utilized in combination with the printer bar.

It is the primary object of the present invention to provide a low cost, maintenance free, commercially acceptable facsimile recorder in which the electrode structure performing the function of the helix is stationary.

Another important object of the present invention is the provision of an improved facsimile recorder which permits printing at speeds limited only by the ability of the paper to produce the copy and which is compatible with existing facsimile systems. This object is accomplished in the preferred embodiment by replacing the helix with a printed circuit board having conductor lines in the order of 900 for a copy 9" wide, each line having a width in the order of .006" and a spacing in the order of .004" from each adjacent line at the printing section of the board. In the preferred embodiment, the printer bar is in the form of a metallic tape carried by a pair of spaced reels for movement from one reel to the other. In the preferred embodiment, the conductor lines terminate in a generally circumferential contact pattern which is sequentially swept by a rotating commutator contact wiper driven in synchronism with the incoming signals.

It is another object of the present invention to provide a facsimile recorder of the type described which is characterized by low cost, silent operation and a smaller overall size.

Other objects and the various features of the present invention will be evident upon a perusal of the following description taken in conjunction with the accompanying drawings in which.

Figure 3:
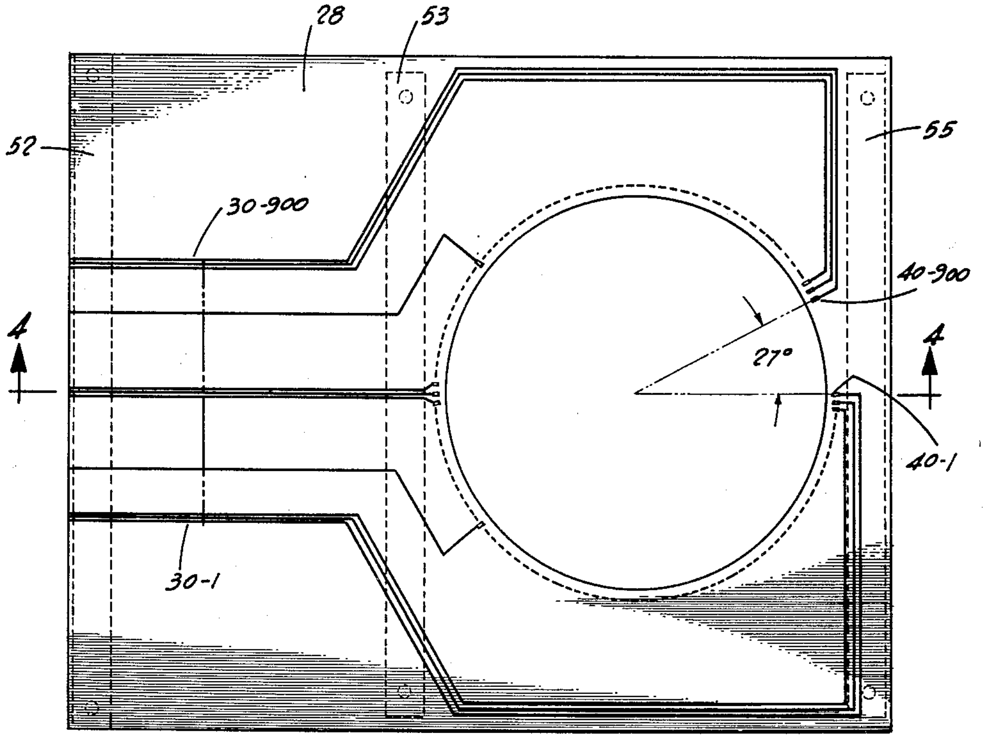
FIG. 3 is a plan view of the circuit board.
Figure 4:
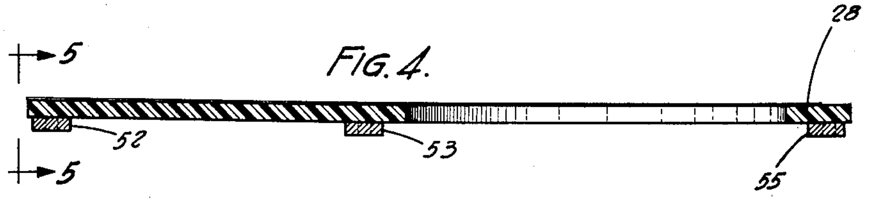
Figure 5:
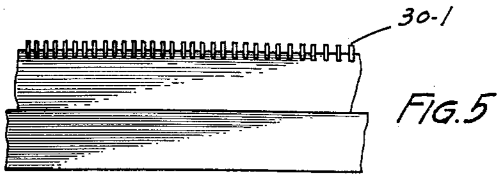

FIGS. 4 and 5 are elevation views of the circuit board along lines 4—4 of FIG. 3 and 5—5 of FIG. 4.

Figure 2:
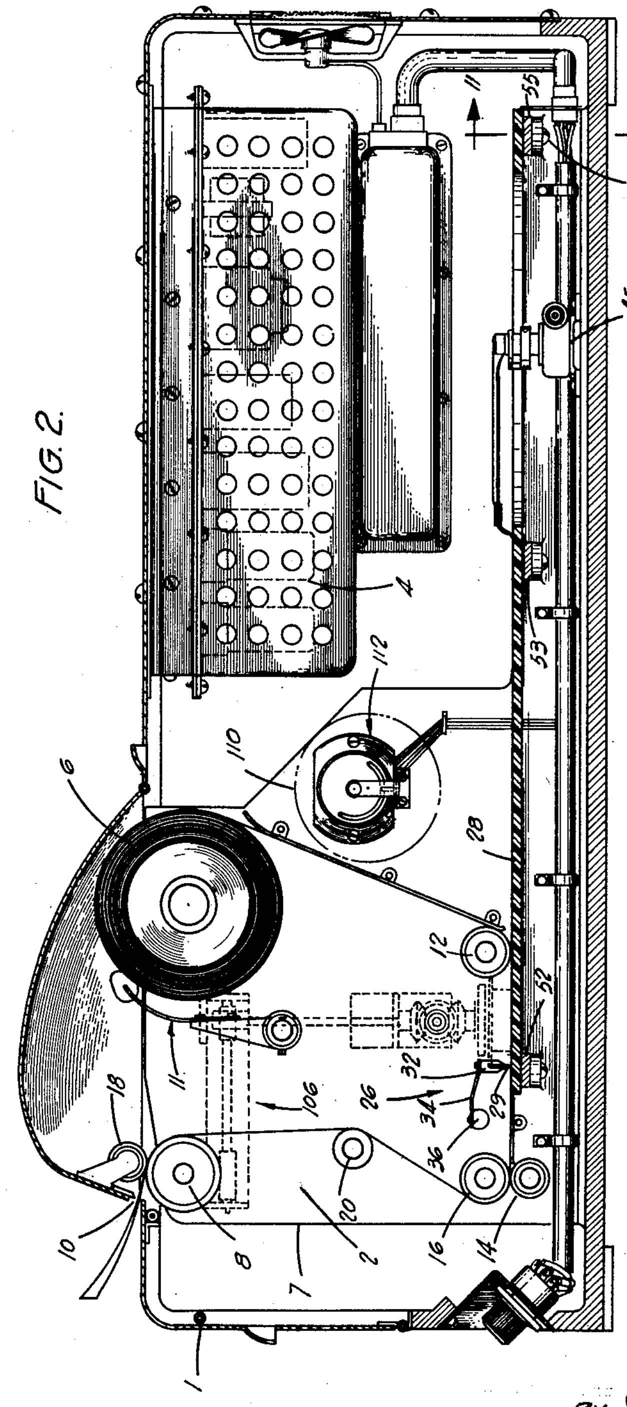
FIG. 2 is a side elevation view partially in section of the improved recorder.
Figure 11:
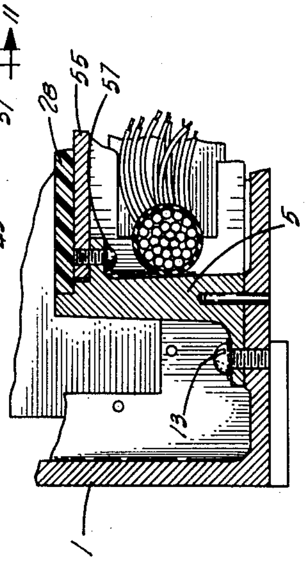

FIG. 6 is a partial elevation view showing the printer bar tape and its associated equipment;

FIG. 7 is a partial elevation view showing the commutator wiper;

FIGS. 8 and 9 are partial views along lines 8—8 and 9—9 of FIG. 7;

FIG. 10 is an elevation view of the end of the wiper;

FIG. 11 is a partial elevation view of the circuit board support means along line 11—11 of FIG. 2; and FIG. 12 shows a second commutator wiper embodiment.

Facsimile apparatus is typically characterized by a transmitter at one location for scanning an image line by line. The scanned lines are parallel and of very narrow width. The transmitter produces signals corresponding to the image. The signals produced vary in intensity in accordance with intensity of the varying shade (white or gray to black) portions of the image as they are scanned.

These signals together with the various well known synchronizing and control signals are transmitted to a facsimile recorder in a distant location.

The transmitted copy is duplicated by the receiver in varying shades of gray or white to black on a white electrolytic recording paper. Iron from the receiver's printer blade or electrode is deposited in an electrolytic copy paper by an electric marking current which varies in intensity in accordance with the received facsimile signals. The receiver includes a heater bar which completes the electrolytic printing process and dries the paper.

Briefly, the receiver includes electronic apparatus typically consisting of a pre-amplifier section, a marking amplifier section, an enabling amplifier section and a phasing multivibrator section. The pre-amplifier amplifies and filters the incoming facsimile signals consistent with the overall system requirements and incorporates automatic gain control to reduce the effects of variations in the input signal level. The filter may be of the band-pass type. The marking amplifier takes the pre-amplifier output, detects and converts it to printing current through the electrolytic recording or copy paper. The enabling amplifier senses the pre-amplifier output and uses the presence of this signal to initiate and to maintain receiver operation. The phasing multivibrator section derives its input signal during a phasing period from the marking amplifier output through a phasing commutator. It includes circuits to insure automatic phasing between a receiver helix electrode (or its equivalent) and the transmitter scanning system whenever transmission is initiated.

The receiver automatically returns to a stand-by condition when its input signal is removed and will so remain until it is rephased at the start of the next transmission. An example of this equipment is the Stewart-Warner Corporation FT–11 transmitter, FR–11 receiver combination.

Figure 1:
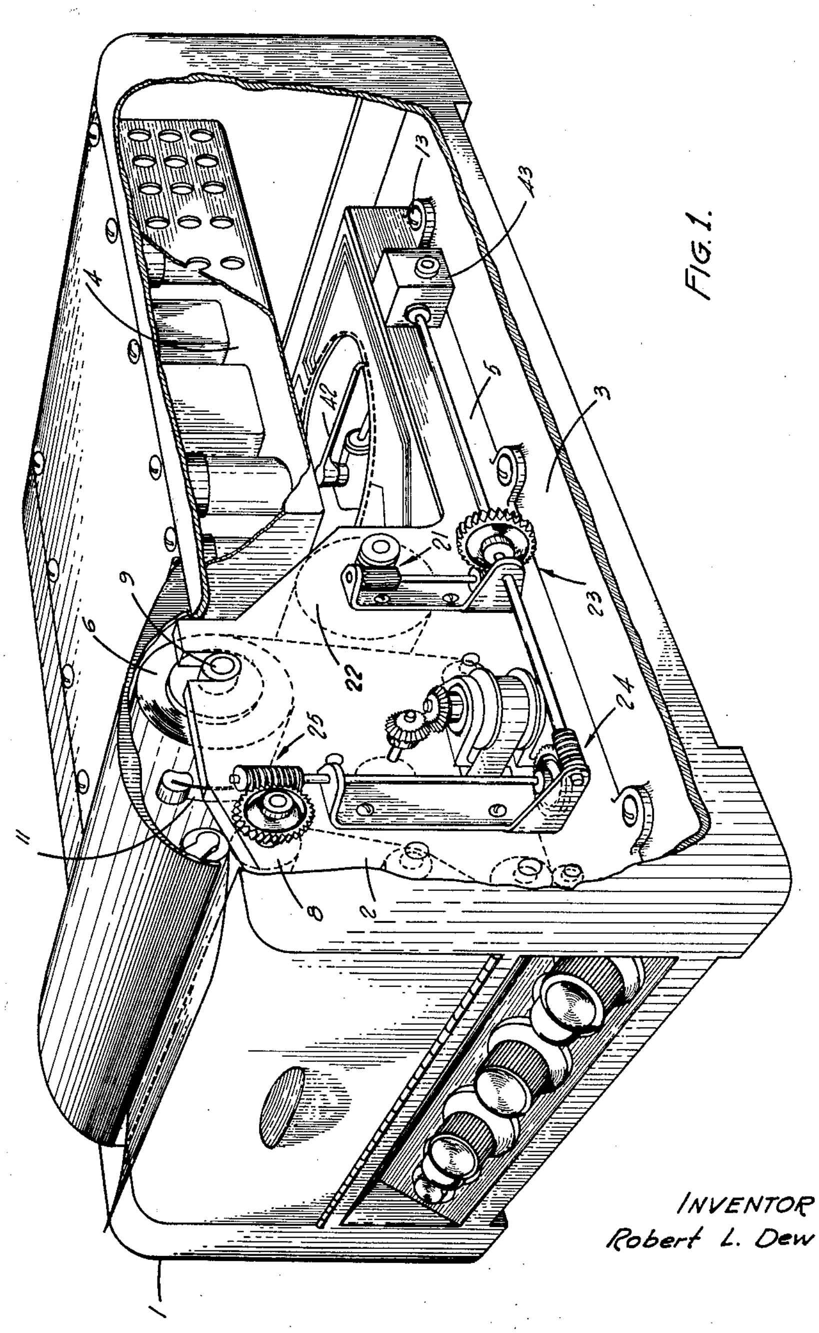
FIG. 1 is a perspective view of the improved recorder.

The improved receiver comprises a cabinet 1 (FIGS. 1 and 2) with a printing compartment 2, a circuit board and contactor compartment 3, and an electronic apparatus compartment 4. An elongated frame structure comprising a pair of vertical castings 5 and 7 are secured to the base of the cabinet by screws 13.

A roll of facsimile copy reader paper 6 is rotatably mounted on a shaft 9 carrier by the castings 5 and 7 in an elevated position within the compartment 2. A paper drive roller 8 is located forwardly of the paper roller 6 adjacent a paper cutter aperture 10. Spring assemblies 11 maintain a bias pressure on the paper 6 as it is pulled off its roll by the drive roller 8. The paper 6 is threaded past guide rollers 12, 14 and 16 to the drive roller 8 and its cooperating roller 18 and passes through the aperture 10. A heater bar 20 engages the paper to dry it subsequent to printing. A motor 22 operates the drive roller 8 by way of step-down gears 21, 23, 24 and 25.

A printing mechanism 26 is mounted within the compartment 2 intermediate the guide roller 12 and rollers 14, 16. The printing mechanism comprises a first electrode in the form of a printed circuit board 28 and a second printer electrode preferably in the form of tape 29.

In its preferred embodiment, the circuit board comprises 900 conductor lines 30–1 to 30–900 (FIG. 3)

for 9″ copy width, which lines are in the order of .006″ wide with .004″ spacing therebetween.

Each of the conductor lines 30–1 to 30–900 terminates in a respective commutator segment or contact 40–1 to 40–900. The commutator contacts are equally spaced about a circumferential path traversed by a commutator wiper 42. The wiper makes one complete revolution for each line which is printed on the copy paper.

An annular space in the order of 27° is provided between the first contact 40–1 and the last contact 40–900. This spacing provides a blanking time during which no incoming printing signals are received. This is the retrace time between the end of scanning of one line and subsequent, start of scanning of the next succeeding line. In fascimile equipment, this retrace time is generally utilized in a well known manner for the transmission of the signal for synchronizing the receiver with the transmitter.

The wiper 42 includes an elongated arm 44 carried by a vertical shaft 41 on an axis perpendicular to the plane of the printed circuit board. The shaft 41 is driven by the motor 22 by way of step-down gears 21, 23, 43 (FIG. 1) and 45 (FIG. 2). In typical existing commercial equipment of the helix type, printing occurs at speeds in the order of 180 lines per minute and 360 lines per minute. In the event that the improved apparatus of the present application is to be utilized at the same speeds, the arm 44 will be rotated alternatively at 180 r.p.m. or 360 r.p.m. However, because the helix electrode is not used in the present apparatus, the speeds of the facsimile systems may now be substantially increased.

The printed circuit board 28 may be made of a suitable insulating material such as a glass base epoxy resin. The conductor lines 30–1 to 30–900 may be made of pure copper, which at least at the printing portions thereof and at the commutator contact portions thereof is preferably plated with rhodium in the order of 20 microinches thick. The plating will greatly enhance the resistance to wear.

At the commutator contactor portions 40–1 to 40–900, the conductor line width is preferably in the order of .028″ with a spacing in the order of .012″. The diameter of the annulus defined by the commutator contacts 40–1 to 40–900 may be in the order of 12½″. The conductor line surfaces may be made flush with the epoxy resin base However, in the preferred embodiment, the upper surface of the conductor lines are raised above the base a small distance in the order of .010″. This raised portion is exaggerated in FIGS. 5, 10 and 12 for clarity. This permits the wiper 42 to more adequately maintain the contacts free of dust, corrosion, etc. At the printing area this assures better contact between each electrode and the paper.

Subsequent to the printing and plating operations, the conductor lines are preferably further treated at the printing section to assure a uniform flat surface in a single plane. This is accomplished by first grinding a carefully controlled surface on the bottom of the circuit board base opposite the printing area. This ground portion is then bonded to a smoothly ground rigid metal bar 52. This will inhibit damage to the printing area by any tendency of the circuit board to warp. The upper plated surfaces of the conductor lines at the printing areas are then finally ground and polished so that they lie in a single plane. The bar 52 supports the printing end of the circuit board and is suitably secured to the frame castings 5 and 7 by screws 51 (FIG. 6).

The central portion and the opposite end of the circuit board are preferably bonded to bars 53 and 55. These bars are secured to the castings 5 and 7 by screws 57.

The printer electrode 29 is preferably in the form of a metallic tape, the lower edge of which is finely ground and polished to provide a flat surface parallel to the juxtaposed printing surfaces of the conductor lines. The printer tape in the preferred embodiment has a thickness in the order of .010″ and a height in the order of $^3\!/_{16}$″.

Hence the overlap area of the electrode elements is in each instance .006″, the width of the conductor lines, by .010″, the thickness of the tape 29. The paper 6 moves between the circuit board 28 and the tape.

As seen in FIG. 6 the tape 29 is carried by a pair of reels 54 and 56. During operation of the apparatus the tape is slowly drawn from one reel to the other to present a continuously though slow moving printer surface. This will prevent poor reproduction which would otherwise occur in a stationary element due to loss of material at the conductor lines. This loss is due to well known ion deposit from the printer electrode to the paper during image reproduction.

Means are provided for maintaining that portion of the tape which is being utilized for printing in a straight line and resiliently urged toward the paper and printed circuit board with a desired force. This is accomplished by providing a slotted bar 32 receiving the tape and a plurality of spaced springs 34. The springs 34 are secured to a supporting bracket 36 and support the bar 32 at their outer free ends. The bracket 36 is carried by castings 5 and 7.

The reel 56 (FIG. 6) is rotatably carried by an ear 80 on casting 7 and a bracket 82. Friction washers 84 are placed on either side of reel 56. A bevel gear 86 is secured for coaxial rotation with the reel 56. Reel 54 is similarly mounted and provided with a gear 88. Gears 90 and 92 fixed to a shaft 94 alternatively rotate gear 86 and its reel 56 or gear 88 and its reel 54. The shaft 94 is urged to its position shown in FIG. 6 by a solenoid 96 including a coil 98 and a plunger comprising the shaft 94 and a soft iron washer 100. The shaft is urged to its opposite position by spring 102.

A drive gear 104 driven from the drive roller by a step-down gear assembly 106 (FIG. 2) meshes with a driven gear 108. The gear 108 is keyed to the shaft 94 and is reciprocable thereon. Hence the gear 108 meshes with drive gear 104 in both positions of the shaft.

A small synchronous motor and gear reducer 110 operates a commutator mechanism 112 to energize the coil 98 when the reel 56 is nearly empty of tape and to deenergize the coil when the reel 54 is nearly empty.

The commutator wiper arm 44 (FIG. 7) carries a removable contact spring 60 at its outer free end. The lower end of the spring has a generally V-shaped surface 62 engaging the commutator contacts 40–1 to 40–900 in sequence.

The wiper 42 is electrically insulated from the shaft 41 by a flat fiber washer 64 and a fiber sleeve 66. Electrical connection to the wiper is provided by a stationary insulated terminal 68, a stationary wiper 70 of spring material, and a metallic sleeve 72. The sleeves 66 and 72 rotate with the shaft 41 and the wiper 42.

In the embodiment of FIGS. 1–11, the spring 60 has a contacting surface with a width less than the spacing between succeeding contacts in the group 40–1 to 40–900. Therefore, engagement with one contact is lost prior to engagement with the next succeeding contact. The making and breaking of contacts will necessarily lead to surge currents. However, current control apparatus is presently available, for example, in model FR–11 manufactured by Stewart-Warner Corporation, which will inhibit excessive current flow through the copy paper and which will maintain the energy input to the paper relatively constant.

In the event that it is desirable to further reduce the tendency to produce surge currents, the embodiment of FIG. 12 may be used. The lower surface **62*a* of the spring 60*a* engages a next succeeding contact 30–3*a* prior to disengaging contact 30–2*a*. In this manner, the marking circuit is not broken except between the 27° spacing of contacts 30–900*a* (not shown) and 30–1*a***.

The electronic apparatus in compartment 4 produces a marking potential corresponding to received signals in a well known manner. It then applies the marking potential across the printer tape 29 and the wiper 42. During each cycle of operation for printing one line, the wiper 42 makes one complete revolution and the drive roller 8 moves the paper a distance equal to one line. During the printing portion of each cycle, the wiper sequentially extends the marking potential to each line 30–1 to 30–900. With the marking potential across one of the contacts and the adjacent printer tape, a marking current flows from the tape and through the copy paper to the contact. The electrical energy dissipated in the copy paper produces a coloring of the paper as a function of the intensity of energy. A visual reproduction is thus formed on the copy paper bit by bit along each line. The heater bar 20 completes the printing process and dries the paper.

While there have been described what are at present believed to be the preferred embodiments of the invention, it will be understood that various changes and modifications may be made therein; and it is contemplated to cover in the appended claims all such changes and modifications as fall within the true spirit and scope of the invention.

What is claimed is:

1. In a facsimile recording device of the type in which electrical apparatus selectively energizes an electrical marking circuit in accordance with received signals containing synchronizing and marking components for producing a visual image corresponding to the signals on an electrolytic copy paper moved through the recording device, in combination with the electrical apparatus an electrical printing mechanism comprising a circuit board having a printing section and a switching section, a plurality of conductor lines on the board in the order of one hundred lines per inch at the printing section and arranged in a plane, parallelly spaced and insulated from one another, the conductor lines at the switching section of the circuit board forming a generally circular pattern of contacts, a rotatable brush in receipt of said marking component and sequentially engaging the contacts to momentarily connect each contact in the marking circuit, mechanism rotating the brush in synchronism with the synchronizing component of said received signals, and an elongated printer electrode connected in the marking circuit, having an edge with a thickness in the order of .010″ extending in transverse relation across the conductor lines along the lengths thereof at the printing section, the conductor lines and printer electrode edge receiving the copy paper therebetween for printing.

2. In a facsimile recording device of the type in which electrical apparatus selectively energizes an electrical marking circuit in accordance with received signals containing synchronizing and marking components for producing a visual image corresponding to the signals on an electrolytic copy paper moved through the recording device, in combination with the electrical apparatus an electrical printing mechanism comprising a circuit board having a printing section and a switching section, a plurality of conductor lines on the board in the order of one hundred lines per inch at the printing section and arranged in a plane, parallelly spaced and insulated from one another, the conductor lines at the switching section of the circuit board forming a generally circular pattern of contacts, a rotatable brush in receipt of said marking component and sequentially engaging the contacts and engaging successive contacts pior to disengaging next preceding contacts to momentarily connect each contact in the marking circuit without breaking the marking circuit, mechanism rotating the brush in synchronism with the synchronizing component of said received signals, and an elongated printer electrode connected in the marking circuit, having an edge thickness in the order of .010″ and extending in transverse relation across the conductor lines along the lengths thereof at the printing section, the conductor lines and printer electrode edge receiving the copy paper therebetween for printing.

3. In a facsimile recording device of the type in which electrical apparatus selectively energizes an electrical marking circuit in accordance with received signals containing synchronizing and marking components for producing a visual image corresponding to the signals of an electrolytic copy paper moved through the recording device, in combination with the electrical apparatus an electrical printing mechanism comprising a circuit board having a printing section and a switching section, a plurality of conductor lines arranged in a plane, parallelly spaced and insulated from one another on the circuit board, the conductor lines at the printing section of the circuit board having a width in the order of .006″ and a spacing in the order of .004″ and at the switching section of the circuit board forming a generally circular pattern of contacts, a rotatable electrical brush in receipt of said marking component of sequentially engaging the contacts to momentarily connect each contact in the marking circuit, mechanism rotating the brush in synchronism with the synchronizing component of said received signals, and an elongated printer electrode connected in the marking circuit, having an edge thickness in the order of .010″ and extending in transverse relation across the conductor lines along the lengths thereof at the printing section, the conductor lines and printer electrode receiving the copy paper therebetween for printing.

4. In a facsimile recording device of the type in which electrical apparatus selectively energizes an electrical marking circuit in accordance with received signals containing synchronizing and marking components for producing a visual image corresponding to the signals on an electrolytic copy paper moved through the recording device, in combination with the electrical apparatus an electrical printing mechanism comprising a circuit board having a printing section, a plurality of conductor lines arranged in a plane, parallelly spaced and insulated from one another on the circuit board, the conductor lines at the printing section of the circuit board having a width in the order of .006″ and a spacing in the order of .004″, switching means sequentially connecting the conductor lines in the marking circuit to apply said marking component in synchronism with the synchronizing component of said received signals, and an elongated printer electrode connected in the marking circuit, having an edge thickness in the order of .010″ and extending in transverse relation across the conductor lines along the lengths thereof at the printing section, the conductor lines and printer electrode edge receiving the copy paper therebetween for printing.

5. In a facsimile recording device of the type in which electrical apparatus selectively energizes an electrical marking circuit in accordance with received signals containing synchronizing and marking components for producing a visual image corresponding to the signals on an electrolytic copy paper moved through the recording device, in combination with the electrical apparatus an electrical printing mechanism comprising a circuit board of insulating material having a printing section, a plurality of conductor elements bonded to one side of the board in a plane, parallelly spaced and insulated from one another, the opposite side of the circuit board being formed with a smooth surface at the printing section, a rigid metallic support member having a mating smooth surface bonded to the smooth surface of the circuit board, the conductor elements at the printing section of the circuit board having a width in the order of .006″ and a spacing in the order of .004″ with their outer surfaces being ground and polished to lie in a single plane, switching means sequentially connecting the conductor elements in the marking circuit to apply said marking component in synchronism with the synchronizing component of said received signals, and an elongated printer electrode connected in the marking circuit, having an edge in the order of .010″ thickness facing the conductor elements, said edge being formed to lie in a plane parallel to the first-mentioned plane, and extending in transverse relation across the conductor lines along the lengths thereof at the printing section, the conductor lines and printer electrode receiving the copy paper therebetween for printing.

6. In a facsimile recording device of the type in which electrical apparatus selectively energizes an electrical marking circuit in accordance with received signals containing synchronizing and marking components for producing a visual image corresponding to the signals on an electrolytic copy paper moved through the recording device, in combination with the electrical apparatus an electrical printing mechanism comprising a circuit board having a printing section, a plurality of conductor lines arranged in a plane, parallelly spaced and insulated from one another on the circuit board, the conductor lines at the printing section of the circuit board having a width in the order of .006" and a spacing in the order of .004", switching means sequentially connecting the conductor lines in the marking circuit to apply said marking component in synchronism with the synchronizing component of said received signals, an elongated printer electrode in the form of tape having an edge thickness in the order of .010" connected in the marking circuit, means maintaining an elongated portion of the tape along a straight line transverse to the conductor lines along the lengths thereof at the printing section, means resiliently urging the tape toward the conductor lines, and means moving the tape along said straight line, the conductor lines and printer electrode edge receiving the copy paper therebetween for printing.

7. In a facsimile recording device of the type in which electrical apparatus selectively energizes an electrical marking circuit in accordance with received signals containing synchronizing and marking components for producing the visual image corresponding to the signals on an electrolytic copy paper moved through the recording device, in combination with the electrical apparatus, an electrical mechanism comprising a circuit board having a printing section and a switching section, a plurality of conductor lines on the board at the printing section arranged in a plane, parallelly spaced and insulated from one another, the conductor lines at the switching section of the circuit board forming a generally circular pattern of contacts, a rotatable brush in receipt of said marking component and sequentially engaging the contacts to momentarily connect each contact and its respective conductor line in the marking circuit, means for rotating the brush in synchronism with the synchronizing component of said received signals, an elongated printer electrode connected in the marking circuit and extending in transverse relation across the conductor lines along the lengths thereof at the printing section, the conductor lines and printer electrode receiving the copy paper therebetween for printing.

8. In a facsimile recording device of the type in which electrical apparatus selectively energizes an electrical marking circuit in accordance with received signals containing synchronizing and marking components for producing a visual image corresponding to the signals on an electrolytic copy paper moved through the recording device, in combination with the electrical apparatus, an electrical printing mechanism comprising a circuit board having a printing section, a plurality of conductor lines arranged in a plane, parallelly spaced and insulated from one another on the circuit board, switching means sequentially connecting the conductor lines in the marking circuit to apply said marking component in synchronism with the synchronizing component of said received signals, and an elongated printer electrode connected in the marking circuit and extending in transverse relation across the conductor lines along the lengths thereof at the printing section, the conductor lines and printer electrode receiving the copy paper therebetween for printing.

References Cited in the file of this patent

UNITED STATES PATENTS

| | | |
|---|---|---|
| 420,358 | Rogers | Jan. 28, 1890 |
| 2,370,160 | Hansell | Feb. 27, 1945 |
| 2,610,102 | Gitzendanner et al. | Sept. 9, 1952 |
| 2,615,777 | Deuth | Oct. 28, 1952 |
| 2,794,081 | Luhn | May 28, 1957 |
| 2,872,276 | Eaves | Feb. 3, 1959 |

FOREIGN PATENTS

| | | |
|---|---|---|
| 42,379 | Germany | Jan. 30, 1888 |
| 324,904 | Great Britain | Feb. 4, 1930 |